(No Model.)
J. C. BROWN.
ANIMAL TRAP.
No. 497,089. Patented May 9, 1893.
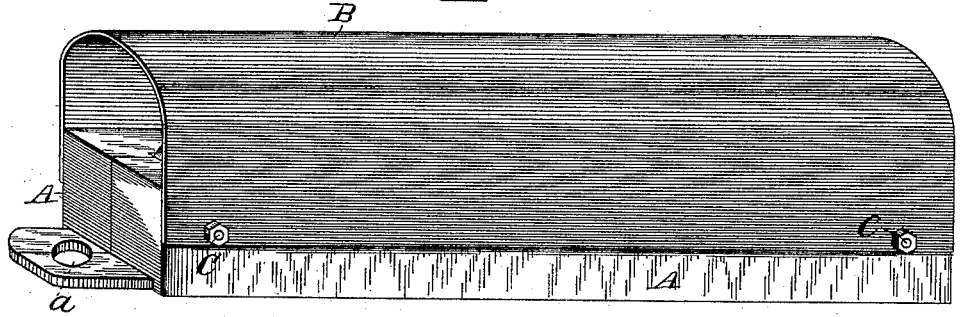
Fig. I.
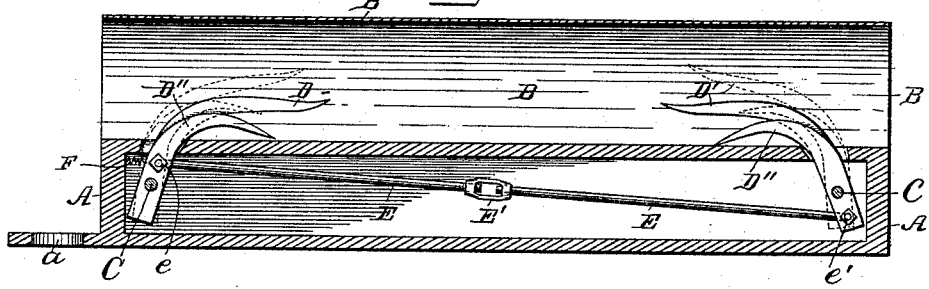
Fig. II.
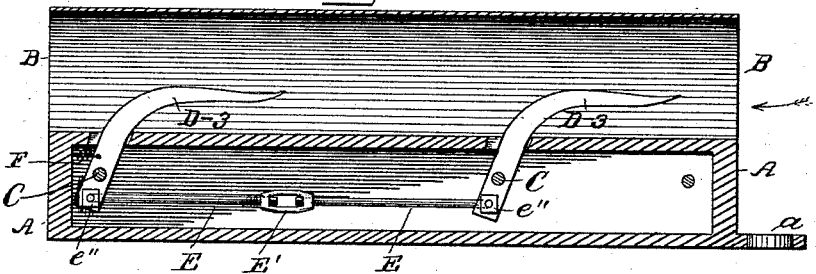
Fig. III.
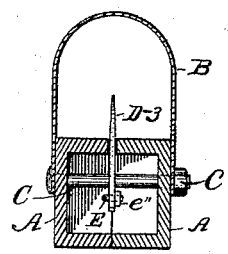
Fig. IV.
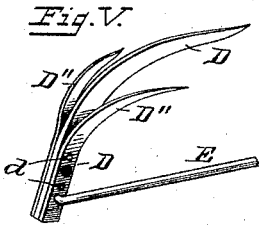
Fig. V.
Witnesses
S E Chamberlain
John Georgen
Inventor:
Julius C. Brown
By R. A. Balderson
His Attorney

UNITED STATES PATENT OFFICE.

JULIUS C. BROWN, OF KANSAS CITY, MISSOURI, ASSIGNOR OF ONE-HALF TO ALBERT W. PALMER, OF SAME PLACE.

ANIMAL-TRAP.

SPECIFICATION forming part of Letters Patent No. 497,089, dated May 9, 1893.

Application filed October 5, 1892. Serial No. 447,958. (No model.)

*To all whom it may concern:*

Be it known that I, JULIUS C. BROWN, a citizen of the United States, residing at Kansas City, in the county of Jackson, State of Missouri, have invented certain new and useful Improvements in Animal-Traps, of which the following is a full, clear, and exact description, reference being had to the accompanying drawings, forming a part hereof.

My invention relates to improvements in animal traps, and my object is, to provide a trap for catching moles and gophers, by constructing it with two knives which operate together by means of a conjunctive rod, attached in the manner hereinafter described, said strap to be placed in the opening of the gopher hole or lead, so that in trying to pass through same, the animal will be caught and imprisoned between said knives.

With this object in view, my invention consists in the novel construction and arrangement illustrated in the accompanying drawings, in which—

Figure I. represents a perspecitive view of my invention. Fig. II. is a central longitudinal section of same, setting forth the mechanism. Fig. III. represents a central longitudinal section of a modified form of construction. Fig. IV. is a cross section, taken on line 4, 4, of Fig. III. and, Fig. V. is a detail view in perspective of one of the knives, showing its construction.

Referring to the drawings by letter, A, represents the base of the trap, composed of wood, or cast iron, and formed in two pieces, so that the connecting rod, spring, &c., may be placed within the same, and concealed from view.

B, represents a semicircular cover or hood, which extends over the entire trap, and is secured thereon by means of the rivet-bolts C, C, as shown, said cover to be made of sheet metal, wire or other suitable material.

D, D', represent knives or spears, which are hinged in the base A, by suitable bolts C, C, and are each provided with two auxiliary knives D'' D'', which are for the purpose hereinafter described, and are secured rigidly to said knives D' D', by rivets d.

E, represents a coupling rod, which is secured to the knives D' D', by nuts e, e', which are threaded on the ends of said rod E. One end of this coupling rod, is attached to knife D, at a point below the hinge-bolt, and the opposite end is secured to knife D', at a point above the hinge-bolt, so that both knives are raised to the positions, indicated by dotted lines in Fig. II. simultaneously. The coupling rod E, is provided with a turnbuckle E', by means of which all slack motion may be taken up.

$D^3$, represents the knives used in the modified form of trap, shown in Fig. III. and are to be constructed substantially as shown, and connected by a rod E, so that the points rise and lower simultaneously.

F, represents a small coil spring, which is attached to one of the knives D D', and to the base A, and serves to hold the knives D D', and $D^3$, just above the surface of the base, or to any desired height. But when any degree of pressure is brought to bear on said knives, the tension of the spring is overcome, and the points of said knives rest down on the base, or close to same.

a, represents a ring, or eye, through which a pin or spike may be driven, to secure the trap in place. The knives D D', are hinged in the base A, with points facing, and are coupled or connected by rod E, as seen in Fig. II. The cover is then secured in place, and the trap is complete; and to catch a mole or gopher, the trap is placed in the lead or hole, so that the space between the cover B, and base A, is coincident with said lead or hole. Then as the animal crawls in from either direction it passes over the back of one of the knives D D', pressing both down to an almost level position, and when it has passed over the knife, the coil spring F, draws the knives back to their normal position, and when the animal tries to pass out, the second knife presents its sharpened point, which prevents further progress. Should it then undertake to go back, the first knife presents a barricade, thus cutting off both points of exit and holds it captive.

Either style of knife shown, may be used with this trap, though my preferred style is that shown in Fig. V. having two or more blades.

The modified form shown in Fig. III. is designed to be placed in the entrance of gopher holes, with the points of the knives pointing outward, so that the gopher may pass out over the knives, but cannot re-enter the hole.

It is a well known fact that a gopher will try in every possible way to re-enter its hole and cannot under any ordinary circumstances be kept out; so that, when trying to force an entrance, it will be impaled on the needle-like point of one of the knives $D^3$.

The trap illustrated in Fig. II. may be used for moles, gophers, ground squirrels, rats, &c., but the trap illustrated in Fig. III. is designed only for gophers.

Having thus fully described my invention, what I claim, and desire to secure by Letters Patent, is—

1. An animal trap, having a base A, and provided with a suitable cover B, which extends its entire length. The knives D, D', hinged in said base, with points facing, and coupled together by a rod E, which causes them to operate simultaneously, essentially, for the purpose specified.

2. In an animal trap, the knives, constructed as shown, having one or more auxiliary blades, and connected by a coupling rod E, set in a base A, which is covered with a hood or covering B, said knives being arranged as shown, so as to permit any small animal to pass over the back of same, and then prevent further progress, substantially as specified.

In testimony whereof I affix my signature in presence of two witnesses.

JULIUS C. BROWN.

Witnesses:
WAITMAN M. MORGAN,
P. YOUNG.